United States Patent [19]
Roth

[11] 3,797,580
[45] Mar. 19, 1974

[54] FOLDABLE AGRICULTURAL IMPLEMENT
[75] Inventor: Robert Richard Roth, Rock Island, Ill.
[73] Assignee: Deere & Company, Moline, Ill.
[22] Filed: Feb. 28, 1972
[21] Appl. No.: 229,668

[52] U.S. Cl.................................. 172/311, 172/501
[51] Int. Cl....................... A01b 49/00, A01b 19/04
[58] Field of Search ......... 56/10.4, 13.6, 14.9, 15.8,
 56/16.2, 273, 276, 283; 172/389–391,
 126–132, 414, 446, 449, 459, 568, 311, 501;
 111/33; 280/411 R, 412

[56] References Cited
UNITED STATES PATENTS

| 2,298,161 | 10/1942 | Robinson | 172/459 X |
| 3,255,830 | 6/1966 | Groenke | 172/456 |
| 3,389,754 | 6/1968 | Allison | 172/389 |
| 3,611,682 | 10/1971 | Isaacson et al. | 56/14.9 |

FOREIGN PATENTS OR APPLICATIONS

| 914,979 | 1/1963 | Great Britain | 56/273 |
| 687,645 | 6/1964 | Canada | 172/456 |

Primary Examiner—Robert E. Pulfrey
Assistant Examiner—Paul T. Sewell

[57] ABSTRACT

A wheeled spring tooth harrow has pivoted wing frames, each of which is movable between operating and transport positions by a hydraulic wing fold mechanism which folds the wings through 155° or more from a position in alignment with the main frame. The wing fold mechanism includes a pair of links having a lost-motion connection which, as the wing is being folded to the transport position, permits the wing to free-fall from a balanced position at approximately 110° closed through approximately 15° and, as the wing is being opened to an operating position, permits the wing to free-fall from the balanced position through approximately 20°. When the wing is in the operating position, the lost-motion connection permits the wing to float through approximately 35° to follow ground contour.

7 Claims, 4 Drawing Figures

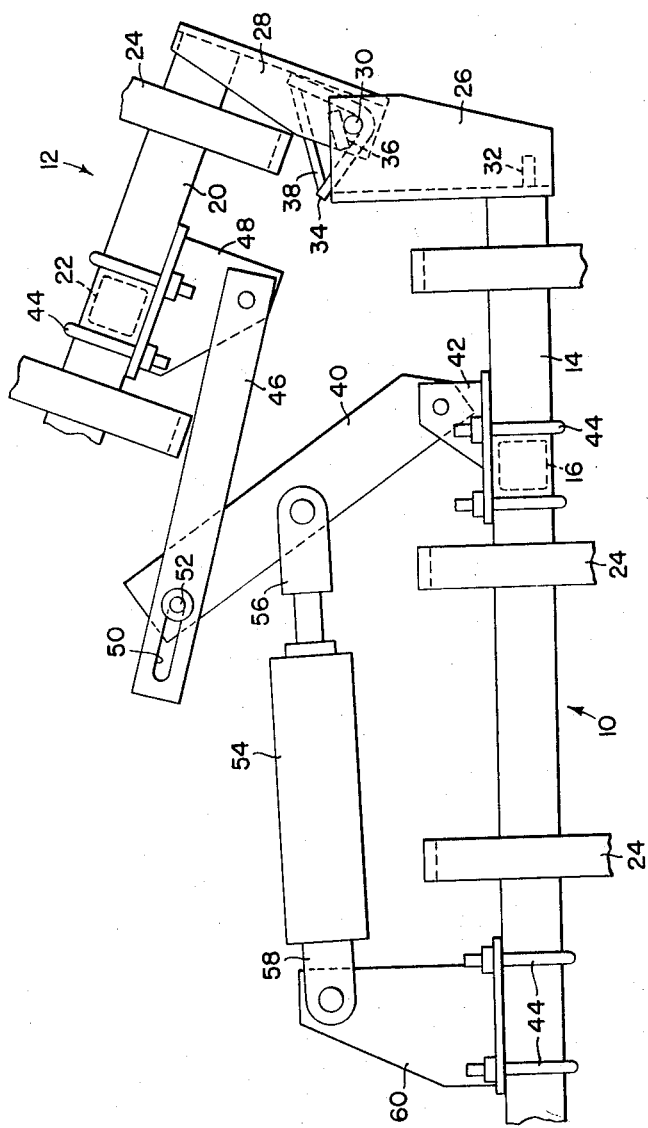
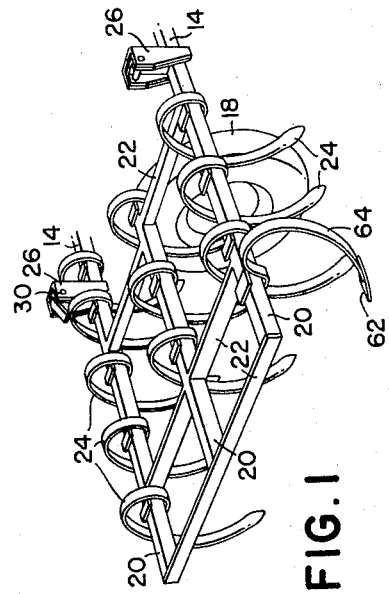

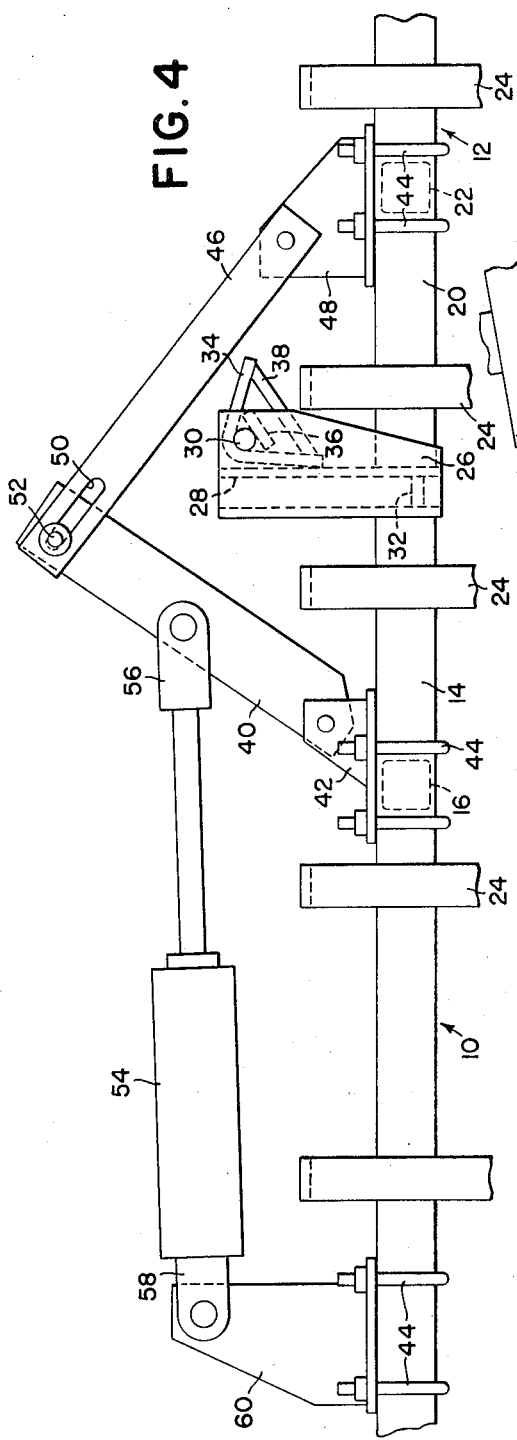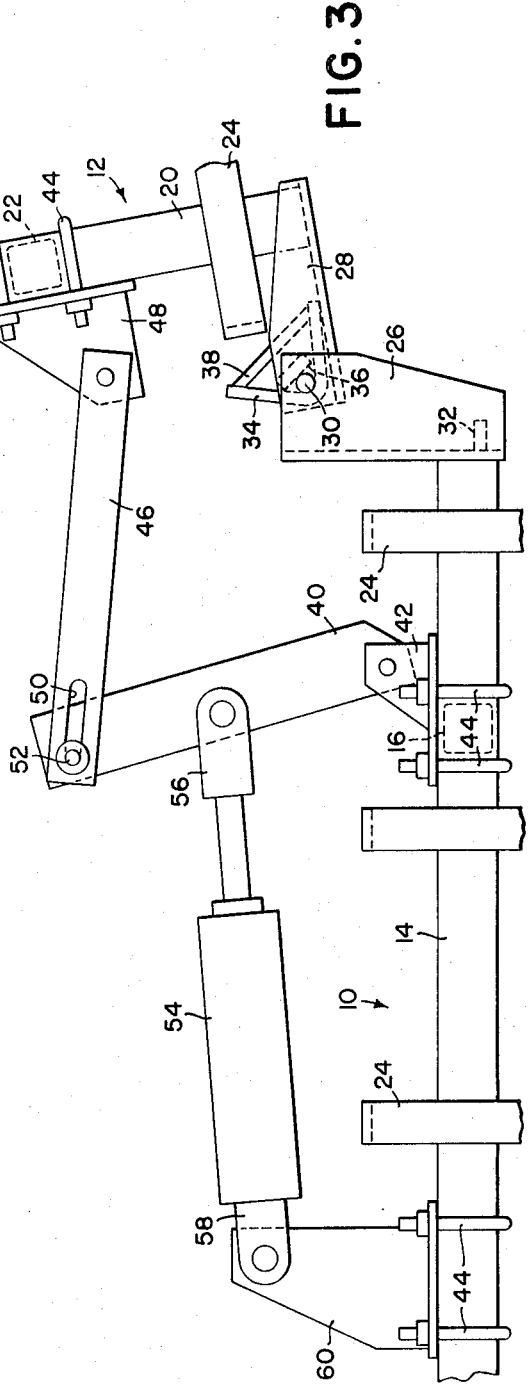

FOLDABLE AGRICULTURAL IMPLEMENT

BACKGROUND OF THE INVENTION

The present invention relates generally to agricultural implements, and more particularly relates to a novel hydraulic wing fold mechanism for an implement having pivoted wing frames.

Agricultural implements having wing frames which are foldable about the main frame from an operating position in general transverse alignment with the main frame to a transport position are well known in the art, but to date each of these implements has had its shortcomings. For example, many of these implements which had a hydraulic folding mechanism limited the folding movement of the wing frames to anywhere from 90° to 120°. With the wing frames at such an angle, any earth-working tools mounted on the wing frames would project laterally and increase the overall transport width of the implement. Also, the hydraulic wing fold mechanisms would not permit the wing to float to compensate for ground contours unless special provision was made in the hydraulic circuitry so that fluid would be free to flow to and from the hydraulic cylinder. The wings on other agricultural implements could be folded through more than 120°, but the folding was accomplished manually. Manual folding of the wings limited the size of the wings and also is time consuming inasmuch as the operator had to stop the propelling tractor, dismount therefrom, fold the wings to their transport position, and climb back onto the tractor.

SUMMARY OF THE INVENTION

The principal object of the present invention is to provide a hydraulic wing fold mechanism for agricultural implements which will fold the wings through approximately 155° so that the tools mounted on the wings do not project laterally and increase the tranport width of the implement.

Another object of the present invention is to provide a hydraulic wing fold mechanism for an agricultural implement which will permit the wing to float through a relatively large angle when in the operating position so that the wing can follow the ground contour.

The above objects and additional objects and advantages of the present invention will become apparent, along with the details of construction of a preferred embodiment of the invention, to those skilled in the art from a reading of the following detailed description when taken in conjunction with the accompanying drawings.

BRIEF DESCRIPTION OF THE DRAWINGS

In the drawings:

FIG. 1 is a perspective view of a portion of an agricultural implement with which the present invention can be used;

FIG. 2 is a rear elevational view of the wing fold mechanism according to the present invention attached to the implement shown in FIG. 1, and illustrating the wing in its folded transport position;

FIG. 3 is a view similar to FIG. 2 but illustrating the wing in an intermediate position; and, FIG. 4 is a view similar to FIG. 2 but illustrating the wing in its lowered operating position.

DESCRIPTION OF THE PREFERRED EMBODIMENT

Referring to the drawings, the wing fold mechanism according to the present invention is illustrated on a spring tooth harrow which includes a main frame 10 and a wing frame 12 pivotally mounted at each side of the main frame. In the drawings, only a portion of the main frame and one of the wing frames is illustrated for simplification purposes. The main frame includes a plurality of transversely extending frame bars 14 and a plurality of fore-and-aft extending frame bars 16, and is supported on wheels 18 for vertical movement between a raised transport position and lowered working positions. The wing frame also includes a plurality of transversely extending frame members 20 and a plurality of fore-and-aft extending frame members 22. A plurality of spring teeth 24 are secured to the transverse frame members of both the main and wing frames in spaced relationship and depend therefrom.

A pair of upstanding channel members 26 have their lower ends secured to the ends of the front and rear transversely extending frame bars of the main frame with their legs extending outwardly from the main frame toward the wing frame. A pair of upstanding channel members 28 which are slightly smaller than the channel members 26 have their lower ends secured to the inner ends of the front and rear frame bars of the wing frame with their legs extending toward the wing frame. The channel members 28 are positioned within the channel members 26 and a pin 30 extends through aligned apertures provided in the upper ends of the legs of the channel members 26 and 28 to pivotally interconnect the channel members and hence pivotally connect the wing frame to the main frame for movement about a generally fore-and-aft extending axis. An abutment or stop member 32 is secured to a lower portion of the bight of each of the channel members 26 and engages the lower end of the respective channel member 28 when the wing frame is pivoted to its normal operating position in transverse alignment with the main frame as illustrated in FIGS. 1 and 4.

The folded transport position of the wing frame is determined by a V-shaped member 34 whose legs straddle the pin 30 and are interconnected by cross members 36 and 38. The cross members 36 and 38 lend rigidity to the V-shaped stop member 34, and the cross member 36 in combination with the legs of the V-shaped member provide a pivotal mounting on the pin 30. One leg of the V-shaped stop member 34 engages the bight of the channel member 28 and the other leg engages the upper end of the bight of the channel member 26 when the wing frame 12 is in its folded transport position as illustrated in FIG. 2.

The wing fold mechanism includes a first arm or link 40 having one end pivotally connected to a bracket 42 secured to the rear transverse frame bar 14 of the main frame by U-bolts 44. A second arm or link 46 has one end pivotally connected to a bracket 48 secured to the rear transverse frame bar of the wing frame by U-bolts 44. The brackets 42 and 48 are positioned with the front face of one in alignment or in the same plane as the rear face of the other so that the free ends of the links 40 and 46 will overlap and engage each other. The free end of the link 46 is provided with an elongated slot 50 and the free end of the link 40 carries a pivot pin 52 which extends through the slot to pivotally interconnect the free ends of the links with a lost-motion connection.

A hydraulic cylinder 54 has its rod end 56 pivotally connected to a central portion of the link 40 and its anchor end 58 pivotally connected to a bracket 60 secured to the rear transverse frame member of the main frame by U-bolts 44. The hydraulic cylinder is of the double-acting type and will be connected to the conventional hydraulic system of the tractor which propels the implement.

A depth limiting member or runner 62 is secured to a standard 64 near the outer end of the wing frame to prevent excessive penetration of the spring teeth thereon in the event the wing frame moves over a higher spot of ground than does the main frame.

The operation of the wing fold mechanism is as follows. With the wing frame in its normal operation position illustrated in FIGS. 1 and 4, retraction of the hydraulic cylinder 54 will act through the links 40 and 46 to fold the wing frame 12 upwardly about the pivot pin 30. When the wing frame has been folded through approximately 110°, it passes through a balanced position on the pin 30 and, due to the slot 50, is free to fall through approximately 15°. Upon continued retraction of the cylinder 54, the wing frame reaches its fully folded transport position in which the V-shaped stop member 34 engages the upper edge of the bight on the channel member 26.

Extension of the cylinder 54 will return the wing frame from the position illustrated in FIG. 2 to its normal operating position illustrated in FIG. 4. In the unfolding operation, as the wing frame reaches the balanced position of approximately 110° from its normal working position, it will, due to the lost-motion connection provided by the slot 50, free-fall through approximately 20°. Continued extension of the cylinder 54 permits the wing frame to pivot downwardly until the channel member 28 engages the stop member 32.

During operation, should the wing frame move over a higher ground surface than the main frame, for example, if the wing frame moves over a levee, the runner 62 acting through the standard 64 will raise the outer end of the wing frame so that the wing frame follows the ground contour. The lost-motion connection provided by the slot 50 permits the wing frame to pivot through approximately 35° with respect to the main frame when following the ground contour.

From the foregoing description, it can be seen that the present invention provides a wing fold mechanism for an agricultural implement which will fold the wing through approximately 155° and which will also permit the wing to follow the ground contour when in the operating position.

Although only a single preferred embodiment of the invention has been described and illustrated, various modifications within the spirit and scope of the invention will become apparent to those skilled in the art and can be made without departing from the underlying principles of the invention.

I claim:

1. An agricultural implement comprising: a main frame adjustably supported on wheel for vertical movement between a raised transport position and any one of a plurality of working positions; said wheels supporting the main frame generally parallel to the ground surface beneath the frame; a wing frame connected to one end of the main frame for vertical pivotal movement about a generally fore-and-aft extending axis between working and transport positions; a pair of generally aligned brackets secured to the main and wing frames; a first rigid link having one end pivotally connected to the bracket on the main frame and a second rigid link having one end pivotally connected to the bracket on the wing frame; the first and second links extending upwardly and toward each other when the wing frame is in general alignment with the main frame; an elongated slot provided in the second link with its major dimension extending along the major dimension of the second link; a pivot pin carried by the first link and extending through the slot to provide a lost-motion connection between the links; and an extensible and retractable hydraulic cylinder connected between the main frame and first link; the links, slot, pivot pin and hydraulic cylinder being so arranged and constructed that when the wing frame passes through a balanced position in its movement about the fore-and-aft extending axis between the working and transport positions it continues its movement independently of any movement of the hydraulic cylinder within the limits of the lost-motion connection, and when the wing frame is in its working position it is free to move relative to the main frame within the limits of the lost-motion connection.

2. An agricultural implement as set forth in claim 1 wherein abutment means acting between the two frames limit downward pivotal movement of the wing frame to a position in transverse alignment with the main frame.

3. An agricultural implement as set forth in claim 2 wherein runner means carried by the wing frame limits the minimum distance between the outer end of the wing frame and the ground surface.

4. An implement frame adapted to be moved forwardly over the ground comprising: a pair of frame sections; one of the frame sections being adjustable supported on wheels in general parallelism with the ground surface thereunder; means pivotally connecting said frame sections together in side-by-side relationship for movement of the other of said frame sections about the one between a working position in generally horizontal alignment with the one frame section and a transport position overlying the one frame section; a rigid link having one end pivotally connected to the other of the frame sections; an arm pivotally mounted at one end on the one of the frame sections; means pivotally interconnecting the free ends of the rigid link and arm; an extensible and retractable hydraulic cylinder operatively connected between the one frame section and the arm to pivotally move the free end of the arm toward and away from the pivotal connection between the frame sections whereby the other frame section is pivoted between the working and transport positions; and the pivotal interconnecting means including lost-motion means affording pivotal movement of the other frame section through a limited arc independent of any movement of the hydraulic cylinder whenever the other frame section passes through a balanced position in its movement between the working and transport positions.

5. An implement frame as set forth in claim 4 wherein the means pivotally connecting the frame sections together includes a pair of hinge sections secured to the pair of frame sections and pivotally connected together above the frame sections, and cooperating stop means on the lower portions of the hinge sections limit downward pivotal movement of the one frame section to a position in transverse alignment with the other frame section.

6. An implement frame as set forth in claim 5 wherein a plurality of earth-working tools are secured to and depend from the frame sections, and depth limiting means on the one frame limits the maximum working depth of the tools thereon by pivoting the one frame section about the other frame section within the limits of the lost-motion connection between the arm and link.

7. An implement as set forth in claim 5 wherein the lost-motion connection includes an elongated slot provided in the rigid link and a pin carried by the arm and extending through the slot.

* * * * *